(12) United States Patent
Galli et al.

(10) Patent No.: US 8,860,265 B2
(45) Date of Patent: Oct. 14, 2014

(54) ELECTRICAL MOTOR APPARATUS HAVING IMPROVED COOLING SYSTEM

(75) Inventors: Gianluigi Galli, Mesero (IT); Ivano Rovellini, Parabiago (IT); Silvia Bono, Novara (IT)

(73) Assignee: ABB S.p.A. (IT)

( * ) Notice: Subject to any disclaimer, the term of this patent is extended or adjusted under 35 U.S.C. 154(b) by 187 days.

(21) Appl. No.: 13/050,773

(22) Filed: Mar. 17, 2011

(65) Prior Publication Data
US 2011/0227433 A1    Sep. 22, 2011

(30) Foreign Application Priority Data
Mar. 18, 2010 (IT) ............................ MI2010A000446

(51) Int. Cl.
*H02K 9/06* (2006.01)
*H02K 9/10* (2006.01)
*H02K 9/18* (2006.01)
*H02K 5/22* (2006.01)

(52) U.S. Cl.
CPC . *H02K 9/18* (2013.01); *H02K 5/225* (2013.01)
USPC ................... 310/62; 310/63; 310/64; 310/58

(58) Field of Classification Search
CPC ............ H02K 9/10; H02K 9/14; H02K 9/18; H02K 9/28
USPC .................. 310/62, 63, 64, 52, 54, 58, 59
IPC ....................................................... H02K 9/06
See application file for complete search history.

(56) References Cited

U.S. PATENT DOCUMENTS

| | | | | |
|---|---|---|---|---|
| 4,119,873 A | * | 10/1978 | Sakurai | 310/56 |
| 4,304,296 A | * | 12/1981 | Shaffer | 165/125 |
| 4,884,331 A | * | 12/1989 | Hinshaw | 29/558 |
| 6,580,187 B2 | * | 6/2003 | Bradfield | 310/64 |
| 7,443,062 B2 | * | 10/2008 | Dong et al. | 310/54 |
| 2007/0273220 A1 | | 11/2007 | Koyama et al. | |
| 2008/0030084 A1 | * | 2/2008 | Tsuge | 310/52 |
| 2008/0302509 A1 | * | 12/2008 | Chen et al. | 165/80.3 |

FOREIGN PATENT DOCUMENTS

DE    19618996 A1    11/1997
FR    2923961 A1    5/1998

(Continued)

OTHER PUBLICATIONS

Machine Translation, JP 2000299966 a, Oct. 24, 2000.*
USPTO Translation, JP 60152247 A, Speed Adjustable Motor With Attached Inverter, Aug. 10, 1985.*

(Continued)

*Primary Examiner* — Quyen Leung
*Assistant Examiner* — Thomas Truong
(74) *Attorney, Agent, or Firm* — Denis Ticak

(57) ABSTRACT

An electric motor apparatus having an improved cooling system comprising a first compartment housing an electric motor mounted on a rotating shaft, a second compartment housing an electric circuit adapted to connect said electric motor to a power supply source, and a cooling system adapted to dissipate the heat generated by said electric motor apparatus. The cooling system comprises a fan mounted on said rotating shaft in a position adjacent to said second compartment and on the opposite side with respect to said first compartment and at least one finned heat exchanger adapted to dissipate the heat generated by said electric circuit inside said second compartment.

13 Claims, 4 Drawing Sheets

(56) References Cited

FOREIGN PATENT DOCUMENTS

| | | | | |
|---|---|---|---|---|
| JP | 60152247 A | * | 8/1985 | ............... H02K 9/06 |
| JP | 61102149 A | * | 5/1986 | ............... H02K 9/06 |
| JP | 61185043 A | * | 8/1986 | ............... H02K 9/28 |
| JP | S62115758 | | 7/1987 | |
| JP | 2000299966 A | * | 10/2000 | ............... H02K 9/06 |
| WO | WO9821808 A1 | | 5/1998 | |

OTHER PUBLICATIONS

USPTO Translation, JP 61102149 A, Ventilator for Rotary Electric Machine With Totally-Enclosed-Fan, May 20, 1986.*

USPTO Partial Translation, JP 61185043 A, Wound-Rotor Type Rotary Electric Machine With Air Cooler, Feb. 12, 1985.*

Italian Patent Office Search Report for Application No. IT M120100446; Feb. 15, 2011; Italy.

* cited by examiner

ELECTRICAL MOTOR APPARATUS HAVING IMPROVED COOLING SYSTEM

CROSS REFERENCE TO RELATED APPLICATION

This application claims priority from Italian Application MI2010A000446, filed on Mar. 18, 2010, the contents of which are relied upon and incorporated herein by reference in their entirety, and the benefit of priority under 35 U.S.C. 119 is hereby claimed.

FIELD OF INVENTION

The present application is directed to an electrical motor apparatus having a cooling system with improved features and efficiency. Particularly, the present application is directed to electrical motor apparatus having an improved heat exchanger configuration.

BACKGROUND

As known, electrical motor apparatuses comprise a portion mounted on a rotating shaft, called rotor, and a fixed portion, called stator. An appropriate first compartment of the electrical motor apparatus, or motor compartment, houses the stator and rotor, so as to be separated from the external environment. A second compartment of the electrical motor apparatus, or collector compartment, coupled with the motor compartment, houses, on the other hand, the electrical connections used for starting the motor. The rotating shaft extends lengthwise along the electrical motor apparatus passing through the collector compartment and the motor compartment; the end of the rotating shaft opposite the collector compartment comes out from the motor compartment to drive a load associated with the electric motor, that could be, for example, an industrial machinery.

Usually, the electrical motor apparatus comprise a cooling system adapted to dissipate the heat generated by the stator and rotor inside the motor compartment and by the electrical connections inside the collector compartment. Such cooling system comprises one or more paths created for flowing a cooling fluid.

The cooling of the collector compartment is particularly critical, as the reaching of temperatures higher than 80-100° C. inside of it may compromise the proper operation of those members for the electrical connection with a power supply source, required to start the motor. As an example, the excessive heat in the collector compartment may damage the contact between the brushes and the collector rings mounted on the rotating shaft to slide on the brushes. A non-optimum contact between the brushes and the collector rings may cause, upon the passage of current therein, the occurrence of phenomena that can damage or still decrease the lifetime of collector rings, such as for example, the appearance of sparks.

Currently, electrical motor apparatuses comprise cooling systems that, although adequately performing functions and applications that they are supposed to carry out, still exhibit some aspects susceptible to improvements, in particular for what is concerning the dissipation efficiency of the overall generated heat, and most especially in the collector compartment. Even the arrangement, configuration and versatility of the members composing the cooling system are susceptible to improvements.

As an example, a cooling system of a known type comprises a first pipe heat exchanger that is coupled with and extends lengthwise along the motor compartment, and a second pipe heat exchanger that is coupled with and extends lengthwise along the collector compartment. Alternatively, a single pipe heat exchanger that is coupled with and extends lengthwise along both the motor compartment and the collector compartment may be used.

Pipe inlet openings of the two heat exchangers are in communication with the environment outside the electrical motor apparatus; in particular, the inlet openings of at least one group of pipes of the first heat exchanger are in communication with the environment, through coupling with pipes of the second heat exchanger.

The cooling system comprises means adapted to force inside of it a cooling air flow constituted by air collected from the external environment, flowing from the pipe inlet openings of the two heat exchangers towards the pipe outlet openings of the first heat exchanger. In this way, the surfaces of the pipes are thermal exchange surfaces, through which the heat generated inside the compartments of the electrical motor apparatus is transferred to the cooling air that progressively warms up along its path.

In case of horizontally mounted electrical motor apparatus (that is, with the rotating shaft parallel to the supporting surface whereupon the electrical motor apparatus is mounted), the cooling system comprises a fan mounted on the end of the rotating shaft coming out from the motor compartment in a way opposite to the collector compartment; such a fan is operatively connected to the pipe outlet openings of the first heat exchanger, so as to force the cooling air flow previously described. The fan must be positioned at a certain distance from the opening through which the rotating shaft comes out from the motor compartment to drive the load, such as to allow the correct passage of the cooling air flow. Such distance imposes a constraint to the overall sizing of the electrical motor apparatus.

In case of vertically mounted electrical motor apparatus (that is, with the rotating shaft transverse to the supporting surface whereupon the electrical motor apparatus is mounted), the fan cannot be mounted on the rotating shaft, such as in the horizontal installation, for stability reasons; the cooling air flow is hence generated through one or more auxiliary modules of the electrical motor apparatus, comprising, for example, fans driven by external electric motors; the presence of such auxiliary devices negatively impacts the cost, maintenance and installation simplicity of the electrical motor apparatus.

The main task of the present invention is to realize an electrical motor apparatus having a cooling system capable of overcoming the above-mentioned drawbacks, and in particular, that with regard to known solutions, might more efficiently dissipate the heat produced inside the collector compartment.

SUMMARY

Described herein are electrical motor apparatuses having an improved heat exchanger, comprising a first compartment housing an electric motor mounted on a rotating shaft, a second compartment housing an electrical circuit adapted to connect said electric motor to a power supply source, and a cooling system adapted to dissipate the heat generated by the electrical motor apparatus, wherein the cooling system comprises at least one finned heat exchanger adapted to dissipate the heat generated by the electrical circuit inside the second compartment.

BRIEF DESCRIPTION OF THE DRAWINGS

In the accompanying drawings, structural embodiments are illustrated that, together with the detailed description provided below, describe exemplary embodiments of an electrical motor apparatus having an improved heat exchanger. One of ordinary skill in the art will appreciate that a component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

DETAILED DESCRIPTION

Figure 1:
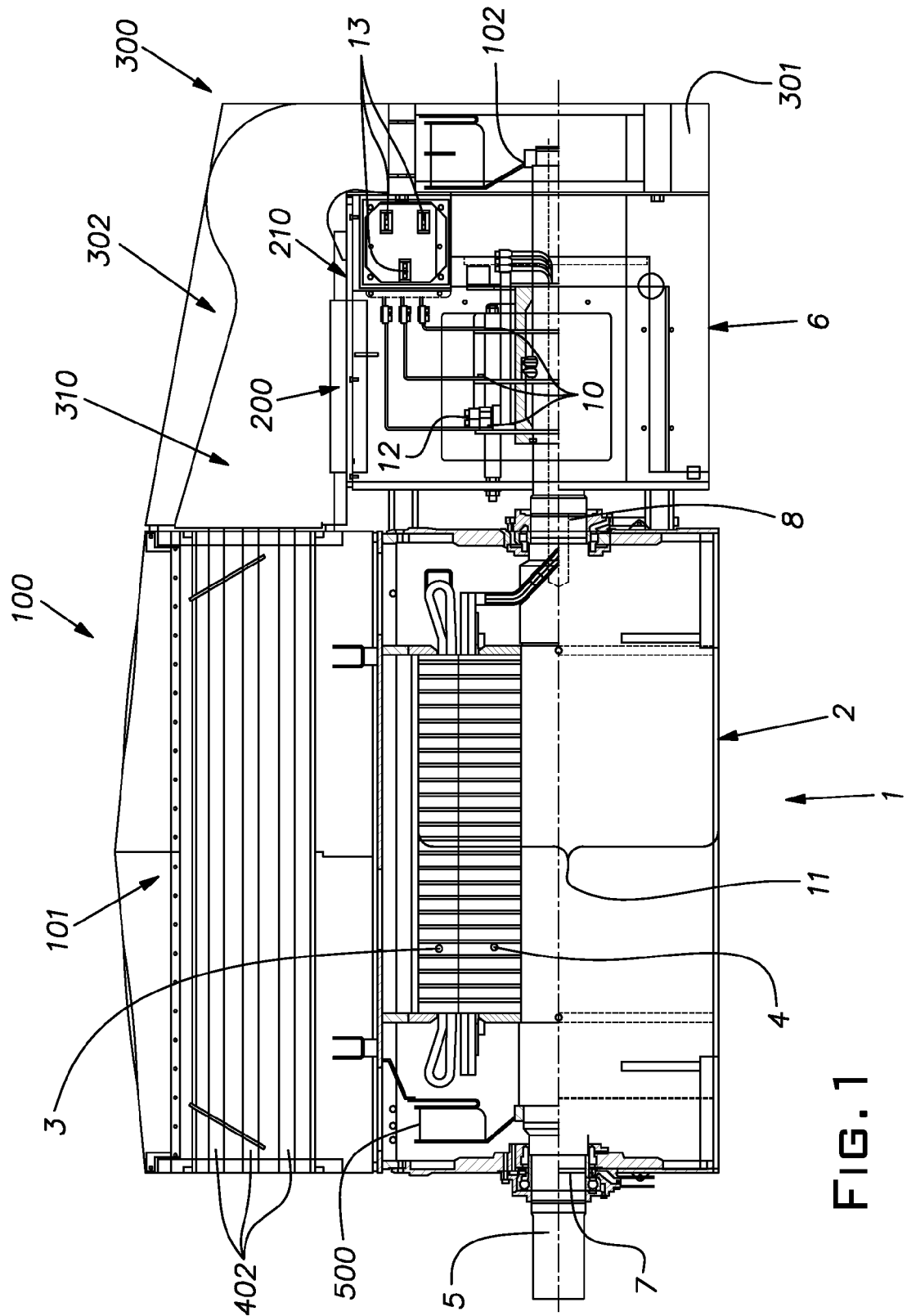
FIG. 1 is a partially cutaway side view of an electrical motor apparatus inside according to the present invention.

FIG. 1 shows the inside of an electrical motor apparatus 1 comprising a first compartment 2, or motor compartment 2, housing an electric motor 11 comprising a stator 3 and a rotor 4; the rotor 4 is mounted on a rotating shaft 5. As an example, the illustrated electric motor 11 is a three-phase asynchronous electric motor with wound rotor; however, it should be set out how the application of the present invention may also extend to electrical motor apparatuses having other known types of electric motor suitable for the use.

The rotating shaft 5 exhibits a first end coming out from a first opening 7 of the motor compartment 2 to drive the load associated with the electric motor 11, and a second end coming out from a second opening 8 opposite to the first opening 7.

The electrical motor apparatus 1 further comprises a second compartment 6, or collector compartment 6, operatively coupled with motor compartment 2, so that the second end of rotating shaft 5 penetrates in the collector compartment 6 and passes through it across its overall longitudinal extension until coming out from it.

The collector compartment 6 houses an electrical circuit, which connects the electric motor 11 to a power supply during the starting phase of motor 11. As an example, in the illustrated embodiment, such electrical circuit comprises a number of collector rings 10 equal to the number of phases of rotor 4: in FIG. 1, three rings 10 connected to the three phases of rotor 4 are visible. The rings 10 are mounted on the part of rotating shaft 5 passing through the collector compartment 6, and each one of them is electrically connected with terminals of a phase of the rotor 4. At the starting of the electric motor 11, such collector rings 10 are serially connected to a power supply source.

In particular, a set of fixed brushes 12 (comprising, for example a number of brushes ranging from two to twenty) leans on each ring 10, such that each ring 10 can slide on the corresponding brushes 12, upon rotation of rotating shaft 5. In turn, the brushes 12 are serially connected to the power supply source. As an example, such power supply source can be constituted by a rheostat positioned on the outside of electrical motor apparatus 1 and across which a certain voltage is provided at the starting the motor. FIG. 1 shows the connections 13 inside collector compartment 6, to connect brushes 12 to rheostat. At the starting of the electric motor 11, the rheostat resistance value equals its peak value to suitably increase the torque of motor 11.

During the start of motor 11, the rheostat resistance is suitably decreased until reaching a zero value when motor 11 performs a number of turns equal to the rated number of turns. When the desired speed of rotation for rotating shaft 5, under regime operating conditions of electrical motor apparatus 1, is reached, the brushes are disconnected from the rheostat after mutually short-circuiting the phases of rotor 4. Alternatively, the rheostat may remain inserted in the electrical circuit to decrease the turns of electric motor 11 with regard to their rated number.

Alternatively, it is however possible to use any circuit adapted to allow the start of electrical motor apparatus 1, for example, a circuit comprising an inverter.

Figure 2:
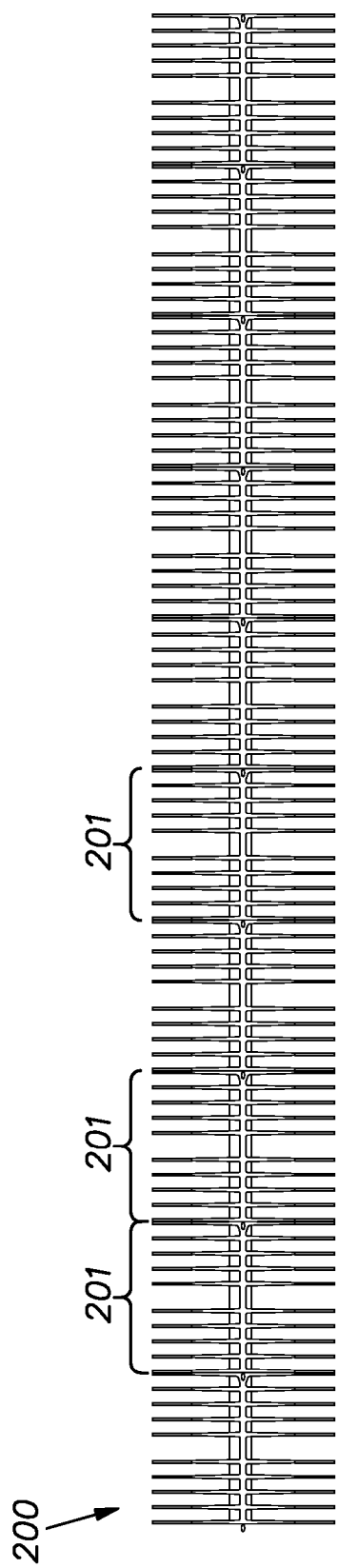
FIG. 2 is a side view of a finned heat exchanger used in the cooling system of the electrical motor apparatus in FIG. 1.

Advantageously, the electrical motor apparatus 1 according to the present invention comprises a cooling system, overall indicated in the cited figures with reference number 100, having at least one finned heat exchanger 200, shown in FIG. 2, adapted to dissipate the heat generated by the electrical circuit inside the collector compartment 6.

Preferably, the cooling system 100 comprises an additional heat exchanger 101 adapted to dissipate the heat generated inside the motor compartment 2. The illustrated heat exchanger 101 comprises a pipe bundle (schematized in FIG. 1 and indicated with reference number 402) and is operatively connected to a wall of motor compartment 2 with the pipes 402 extending along the longitudinal extension of rotating shaft 5.

Alternatively, the heat exchanger 101 may be constituted by a hydraulic circuit, inside which a cooling fluid flows, or by other types of known heat exchangers.

The cooling system 100 further comprises at least one fan 102 to force a cooling air flow, and an air conveyor 300 operatively associated with the fan 102 and the finned heat exchanger 200 as to convey the cooling air flow from the fan 102 towards the finned heat exchanger 200 and towards the pipe heat exchanger 101.

Advantageously, the fan 102 is mounted on the rotating shaft 5 in a position adjacent to collector compartment 6 and on the opposite side with respect to motor compartment 2. Compared to known solutions, in the event that the electrical motor apparatus 1 is mounted horizontally, maintaining a distance between fan 102 and the other parts of electrical motor apparatus 1 would not be a design constraint anymore, as in this way the length of rotating shaft 5 could be shortened, thus decreasing the overall bulk of electrical motor apparatus 1. In the event that the electrical motor apparatus 1 is mounted vertically, compared to known solutions, using of one or more auxiliary modules to force a cooling air flow is not necessary anymore.

Figure 3:
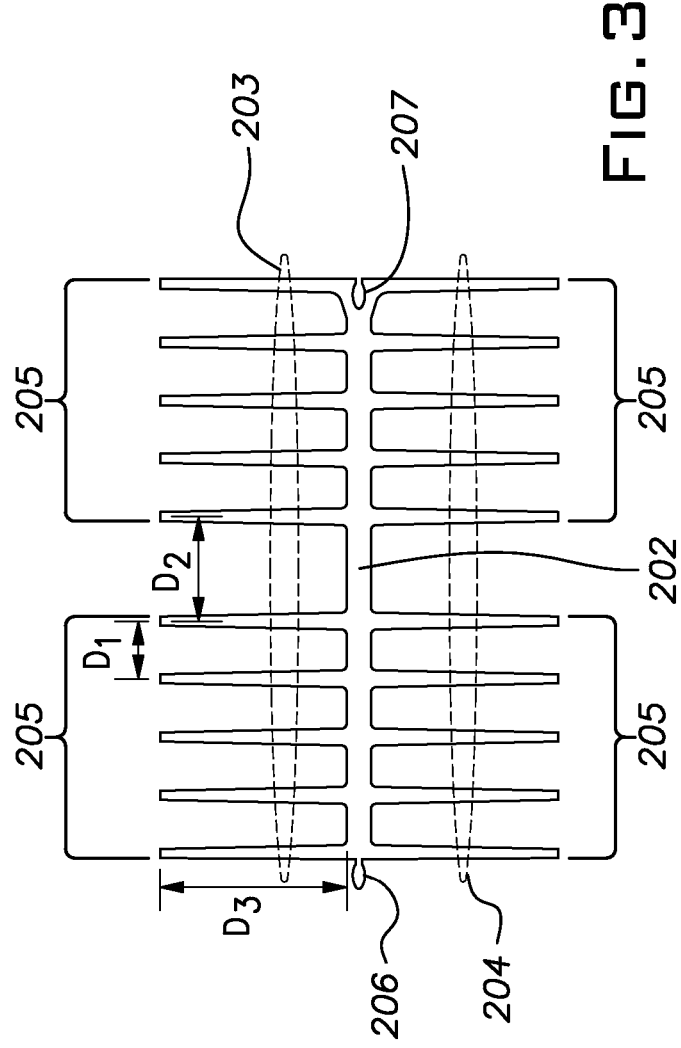
FIG. 3 is an isometric, exploded, and enlarged view of the portion shown in the dashed line 2 of FIG. 1B.

In the illustrated embodiments, the finned heat exchanger 200 comprises a plate having one or more mutually coupled modules 201. As an example, FIG. 2 shows a finned heat exchanger 200 having a plate defined by coupling ten modules 201. FIG. 3 shows a module 201 exhibiting a central body 202 of a substantially parallelepiped shape having a first face, from which a first series of fins 203 leans forward, and a second face, opposite the first face, from which a second series of fins 204 leans forward. As illustrated, each fin of the first series 203 is aligned with a corresponding fin of the second series 204 with respect to central body 202; alternatively, the fins of the first series 203 and the second series 204 may be mutually offset, by alternating them along the longitudinal extension of central body 202.

The first series of fins 203 and the second series of fins 204 may each comprise one or more groups 205 of mutually equidistant fins arranged consecutive to one another along the longitudinal extension of central body 202; the distance D1 between fins belonging to the different groups 205 may be identical or different.

In the illustrated example, the first series of fins 203 and the second series of fins 204 of module 201 each comprise two groups 205 of five fins mutually separated from the same distance D1 (measured between the centerlines of the fins); in turn, the two groups 205 are mutually separated from a minimum distance D2 that is greater with respect to distance D1. Obviously, the number of groups, the number of group fins, and the ratio between distances D1 and D2 may be different than the illustrated one: for example, the first and the second series of fins may be constituted by a single group of ten equidistant fins.

The ratio of distance D3 (measured between the fin ends of groups 205 and the face of central body 202, from which the fins lean forward) to distance D1 has a value between two and four. The respect of such relation between distances D1 and D3 leads to a greater efficiency in exchanging heat between the inside of collector compartment 6 and the cooling air flow. Preferably, the ratio of distances D3 to D1 has a value equal to three.

The modules 201 comprise first male connection means 206 and second female connection means 207 that are defined at opposite ends of central body 202. According to the preferred embodiment shown in FIG. 3, the first male connection means 206 comprise a projection 206, extending from central body 202 transversely with respect to the extension of the first series of fins 203 and the second series of fins 204, and the second female connection means 207 comprise a groove 207 defined in central body 202 transversely with respect to the extension of the first series of fins 203 and the second series of fins 204. Particularly, when the plate of finned heat exchanger 200 comprises two or more modules 201, a projection 206 of a module 201 inserts in a corresponding groove 207 of the adjacent module 201.

The finned heat exchanger 200 is positioned on a first wall and facing the inside of collector compartment 6, such that the first series of fins 203 and the second series of fins 204 of modules 201 lean forward towards the outside and towards the inside of collector compartment 6, respectively. The finned heat exchanger 200 is particularly versatile as its plate fits various sizes that collector compartment 6 may have, by simply removing from or adding to it one or more modules 201.

Figure 4:
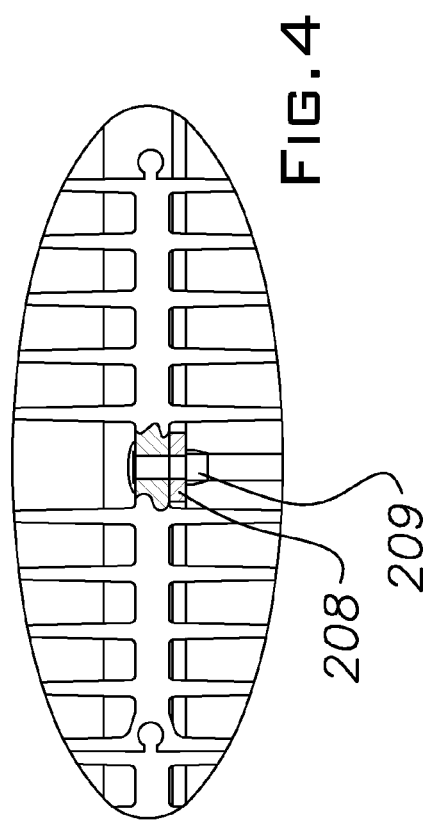
FIG. 4 shows in detail the fastening between a module of the finned heat exchanger in FIG. 2 and a supporting bar.

The second series of fins 204 leans forward the inside of the collector compartment 6 through an opening defined in the first wall of collector compartment 6. One or more mutually parallel bars 208 pass through such opening as to define a supporting grid for finned heat exchanger 200. The portion of central body 202 of modules 201 comprised between two groups of fins 205 leans indeed above the surface of a corresponding bar 208 and can be secured to it, for example, through screw connection means 209, in order to ensure a greater stability to the structure. Such fastening type is shown in detail in FIG. 4.

Figure 5:
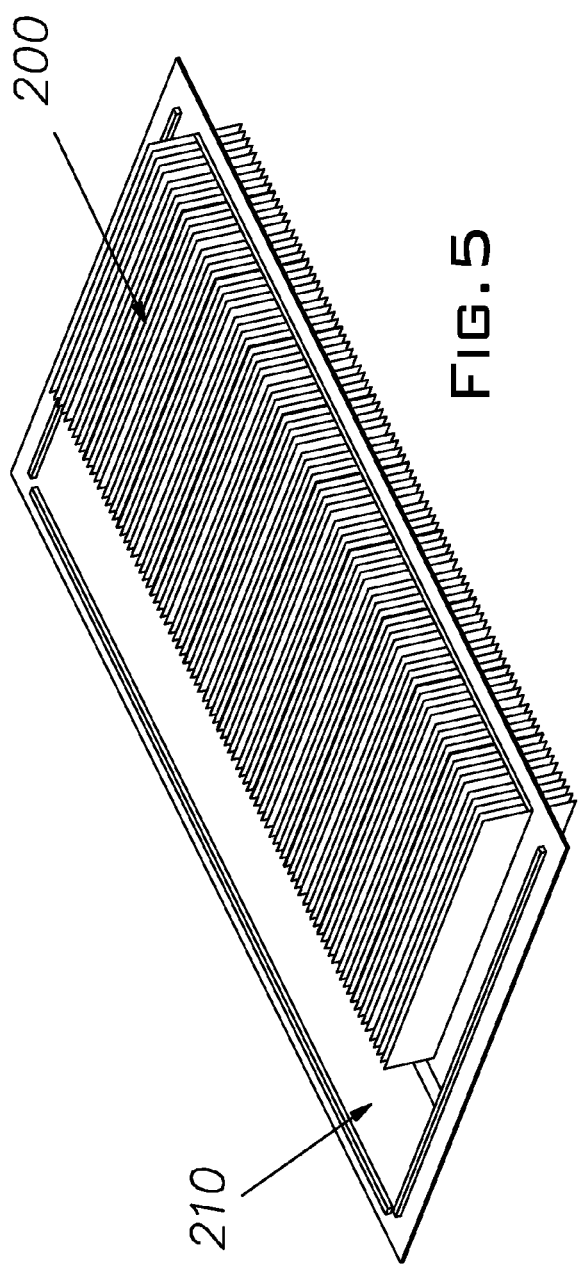
FIG. 5 shows a cover coupled with the finned heat exchanger of FIG. 2.

Bars 208 may directly connect two opposite edges defining the opening of the first wall of collector compartment 6; alternatively, the supporting grid constituted by bars 208 is operatively coupled with a cover 210 (see FIG. 5), which in turn is then positioned on the first wall of collector compartment 6 so as to cover its opening.

Figure 6:
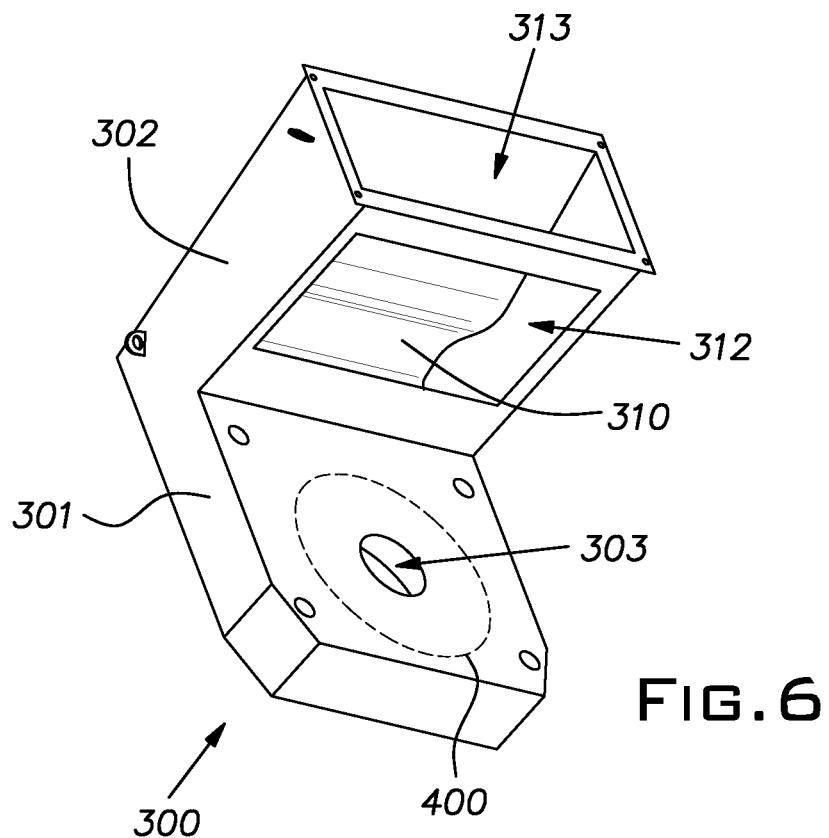
FIG. 6 is a perspective view of an air conveyor used in the cooling system of the electrical motor apparatus in FIG. 1.
Figure 7:
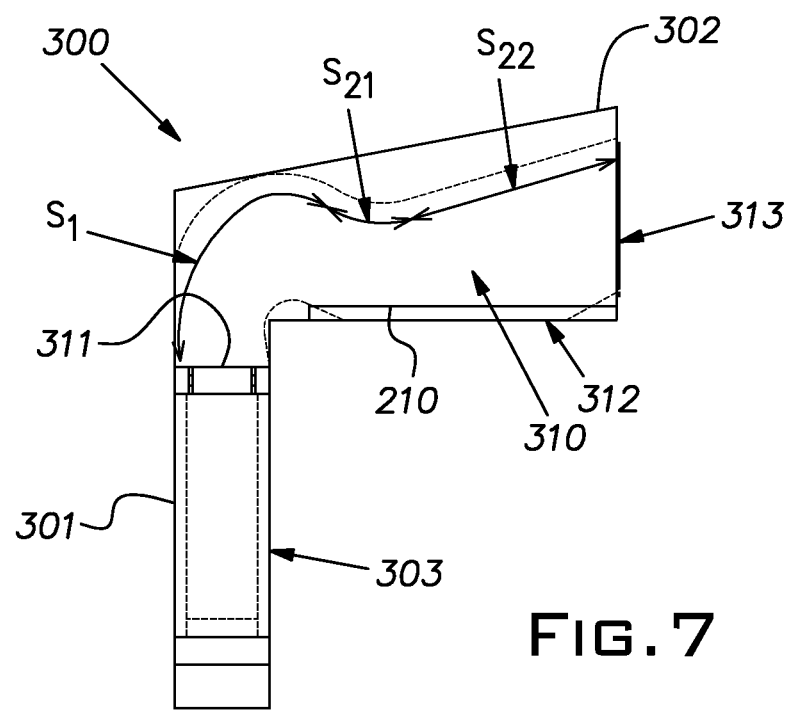
FIG. 7 is a lateral cut out illustrating the inside of the air conveyor in FIG. 6.

FIGS. 6 and 7 show a preferred embodiment of the air conveyor 300, comprising a first portion 301 and a second portion 302. The first portion 301 has primarily the purpose of housing fan 102. Such first portion 301 exhibits a first opening 303 and is coupled with a second wall of collector compartment 6 opposite to motor compartment 2, such that the rotating shaft 5, coming out from the collector compartment 6, enters inside the first portion 301 passing through the first opening 303.

The second portion 302 is transversely connected to the first portion 301 so as to couple with the first wall of collector compartment 6, whereupon the finned heat exchanger 200 is positioned, and comprises a ventilation channel 310 adapted to convey the cooling air flow forced by fan 102 at least towards the finned heat exchanger 200.

Preferably, first portion 301 and second portion 302 of air conveyor 300 are made of a single piece as to achieve a manufacturing cost reduction and a greater simplicity of installation and maintenance.

With a particular reference to FIG. 7, the ventilation channel 310 exhibits a first opening 311 in communication with the internal environment of the first portion 301 of air conveyor 300.

The ventilation channel 310 further exhibits a second opening 312 facing the finned heat exchanger 200 and a third opening 313, transversely defined with respect to the first opening 312, which faces the inlet openings of pipes 402 of heat exchanger 101. The pipe heat exchanger 101 is indeed connected to a wall of motor compartment 2, such that the section where the inlet openings of its pipes 402 are defined extends transversely with respect to finned heat exchanger 200; such section may directly face the third opening 313 (as visible in FIG. 1) or being connected to it through a duct (not visible in figures) interposed between the air conveyor 300 and the pipe heat exchanger 101.

Still with reference to FIG. 7, the ventilation channel 310 has an inner wall opposite the second opening 312 comprising a first section 51 with curvilinear path, with concavity facing the second opening 312, and a second section having a first curvilinear segment S21 joined with the first section 51 and with concavity facing in the opposite direction to second opening 313, and a second substantially rectilinear segment S22 extending from the first segment S21 towards the third opening 313 in a divergent manner with respect to the second opening 312.

Preferably, a vibration-damping membrane may be interposed between the pipe heat exchanger 101 and the motor compartment 2, as to mitigate vibrations produced by electric motor 11 propagating along the structure of electrical motor apparatus 1.

Operatively, fan 102 collects air from the external environment to electrical motor apparatus 1 through a second opening 400 of the first portion 301 of air conveyor 300, opposite the first opening 303, as to create the cooling air flow used in cooling system 100. Such cooling air flow is forced by fan 102 in the ventilation channel 310 through the first opening 311 and is effectively conveyed towards finned heat exchanger 200 due to the shape of the first section 51 and the shape of segment S21 of the second section of ventilation channel 310. Particularly, the cooling air flow is flown through gaps comprised between the fins of the first series 203 of modules 201, by absorbing the heat transferred to finned heat exchanger 200 by the electrical circuit in collector compartment 6.

Indeed, when the electrical circuit for the start of electric motor 11 warms up, it transfers heat to the air present inside collector compartment 6, which flows towards finned heat exchanger 200 and passes through the gaps comprised between the fins of the second series 204 of modules 201. The air transfers heat to finned heat exchanger 200 and, by cooling itself, it flows back towards the electrical circuit. Inside collector compartment 6, an air circulation is created from the electrical circuit to finned heat exchanger 200 and from it back to the electrical circuit.

The cooling air that has flown through the first series of fins 203 is conveyed towards the third opening 313 from the second segment S22 of the ventilation channel 310 and hence towards the inlet openings of pipes 402 of the heat exchanger 101. The heat generated inside the motor compartment 2 is transferred to the cooling air flow circulating in pipes 402 through the thermal exchange surfaces constituted by pipes 402.

An air flow is hence created inside motor compartment 2, which ascends from motor 11 towards pipes 402, cools down and descends again towards motor 11. Such flow may be assisted by an auxiliary fan 500 that is mounted on rotating shaft 5, inside motor compartment 2.

It has been observed in practice how the electrical motor apparatus 1 according to the invention fully performs the predefined task by providing a series of advantages compared to the prior art. Indeed, the heat dissipation inside collector compartment 6, constituting a particularly critical point to ensure the proper operation of electrical motor apparatus 1, occurs through the finned heat exchanger 200 and the air conveyor 300 specially designed for this purpose. Particularly, the finned heat exchanger 200 and air conveyor 300 allow to accomplish the same result in dissipating the heat obtained by using a pipe heat exchanger, but with a lower bulk. In this way, the electrical motor apparatus 1 can be made with smaller overall size.

Additionally, the member typology of the cooling system 100 (like the choice to use the finned heat exchanger 200 of "modular" type), and their arrangement inside the cooling system 100 (like that of mounting the fan in a position adjacent to collector compartment 6 and opposite the motor compartment 2), make cooling system 100 particularly versatile, easy to install and maintain, and cost-effective.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

We claim:

1. An electric motor apparatus comprising:
   a first compartment housing an electric motor mounted on a rotating shaft;
   a second compartment housing an electric circuit adapted to connect said electric motor to a power supply source; and
   a cooling system adapted to dissipate heat generated by said electric motor apparatus, comprising
      a fan mounted on said rotating shaft in a position adjacent to said second compartment and on an opposite side of the shaft with respect to said first compartment;
      at least one finned heat exchanger adapted to dissipate heat generated by said electric circuit inside said second compartment;
      an additional heat exchanger comprising a pipe bundle connected to a wall of said first compartment so as to extend along a longitudinal extension of said rotating shaft; and
      an air conveyor operatively associated with said fan at a conveyor inlet, and forming a ventilation channel enclosing air in operative contact with the finned heat exchanger between the conveyor inlet and inlet of the additional heat exchanger.

2. The electric motor apparatus according to claim 1, wherein said finned heat exchanger is positioned on a wall of said second compartment and adapted such that a portion of said finned heat exchanger faces the inside of said second compartment, said finned heat changer comprising a plate having one or more mutually coupled modules.

3. The electric motor apparatus according to claim 2, wherein said air conveyor comprises:
   a first portion housing said fan, said first portion being coupled with the wall of said second compartment opposite said first compartment;
   a second portion connected transversely to said first portion so as to couple with the wall of said second compartment on which said finned heat exchanger is positioned;
   said second portion comprising a ventilation channel having a first opening adapted to allow the entry of a cooling air flow into said ventilation channel, a second opening facing said finned heat exchanger and a third opening facing the pipes of the pipe heat exchanger.

4. The electric motor apparatus according to claim 3, wherein said ventilation channel comprises an inner wall opposite said second opening which has a first section with curvilinear path with concavity facing said second opening, and a second section that has a first curvilinear segment joined with said first section and concavity facing in the opposite direction to said second opening, and a second substantially rectilinear segment that extends from said first curvilinear segment towards said third opening in a divergent manner with respect to said second opening.

5. The electric motor apparatus according to claim 2, wherein said one or more modules comprise a central body from which a first series of fins and a second series of fins lean forward transversely and on opposite sides from each other.

6. The electric motor apparatus according to claim 5, wherein said first series of fins and said second series of fins comprise one or more groups of mutually equidistant fins arranged consecutive to one another along a longitudinal extension of said central body.

7. The electric motor apparatus according to claim 6, wherein said one or more groups of fins comprise at least a first group and a second group, and wherein one or more mutually parallel bars pass through an opening from which said finned heat exchanger faces the inside of said second compartment, each bar being operatively connected to a portion of said central body between said first group and said second group.

8. The electric motor apparatus according to claim 6, wherein a ratio of a distance between ends of said fins and said central body to a distance between the fins of said one or more groups of fins has a value between two and four.

9. The electric motor apparatus according to claim 8, wherein said one or more modules comprise a male connection and a female connection which are defined at opposite ends of said central body.

10. The electric motor apparatus according to claim 9, wherein said male connection comprises a projection and said female connection comprises a groove.

11. An electric motor apparatus comprising:
  a first compartment housing an electric motor mounted on a rotating shaft;
  a second compartment housing an electric circuit adapted to connect said electric motor to a power supply source; and
  a cooling system adapted to dissipate heat generated by said electric motor apparatus, comprising
    a fan mounted on said rotating shaft in a position adjacent to said second compartment and on an opposite side of the shaft with respect to said first compartment;
    at least one finned heat exchanger adapted to dissipate heat generated by said electric circuit inside said second compartment, positioned on a wall of said second compartment and adapted such that a portion of said at least one finned heat exchanger faces the inside of said second compartment, said at least one finned heat changer comprising a plate having one or more mutually coupled modules;
    an additional heat exchanger comprising a pipe bundle connected to a wall of said first compartment so as to extend along a longitudinal extension of said rotating shaft;
    an air conveyor operatively associated with said fan, with said finned heat exchanger and with said additional heat exchanger so as to convey air from said fan towards said finned heat exchanger and said additional heat exchanger, the air conveyor including a first portion housing said fan, said first portion being coupled with the wall of said second compartment opposite said first compartment, a second portion connected transversely to said first portion so as to couple with the wall of said second compartment on which said finned heat exchanger is positioned, said second portion comprising a ventilation channel having a first opening adapted to allow the entry of a cooling air flow into said ventilation channel, a second opening facing said finned heat exchanger and a third opening facing the pipes of the pipe heat exchanger.

12. The electric motor apparatus according to claim 11, wherein said ventilation channel comprises an inner wall opposite said second opening which has a first section with curvilinear path with concavity facing said second opening, and a second section that has a first curvilinear segment joined with said first section and concavity facing in the opposite direction to said second opening, and a second substantially rectilinear segment that extends from said first curvilinear segment towards said third opening in a divergent manner with respect to said second opening.

13. An electric motor apparatus comprising:
  a first compartment housing an electric motor mounted on a rotating shaft;
  a second compartment housing an electric circuit adapted to connect said electric motor to a power supply source; and
  a cooling system adapted to dissipate heat generated by said electric motor apparatus, comprising
    a fan mounted on said rotating shaft in a position adjacent to said second compartment and on an opposite side of the shaft with respect to said first compartment;
    at least one finned heat exchanger adapted to dissipate heat generated by said electric circuit inside said second compartment and positioned on a wall of said second compartment such that a portion of said finned heat exchanger faces the inside of said second compartment, said finned heat changer including a plate having one or more mutually coupled modules, the one or more modules including a central body from which a first series of fins and a second series of fins lean forward transversely and on opposite sides from each other, wherein the first series of fins and second series of fins include one or more groups of mutually equidistant fins arranged consecutive to one another along a longitudinal extension of said central body, the one or more groups of fins comprise at least a first group and a second group, and wherein one or more mutually parallel bars pass through an opening from which said finned heat exchanger faces the inside of said second compartment, each bar being operatively connected to a portion of said central body between said first group and said second group;
    an additional heat exchanger comprising a pipe bundle connected to a wall of said first compartment so as to extend along a longitudinal extension of said rotating shaft; and
    an air conveyor operatively associated with said fan, with said finned heat exchanger and with said additional heat exchanger so as to convey air from said fan towards said finned heat exchanger and said additional heat exchanger.

* * * * *